Patented Dec. 22, 1942

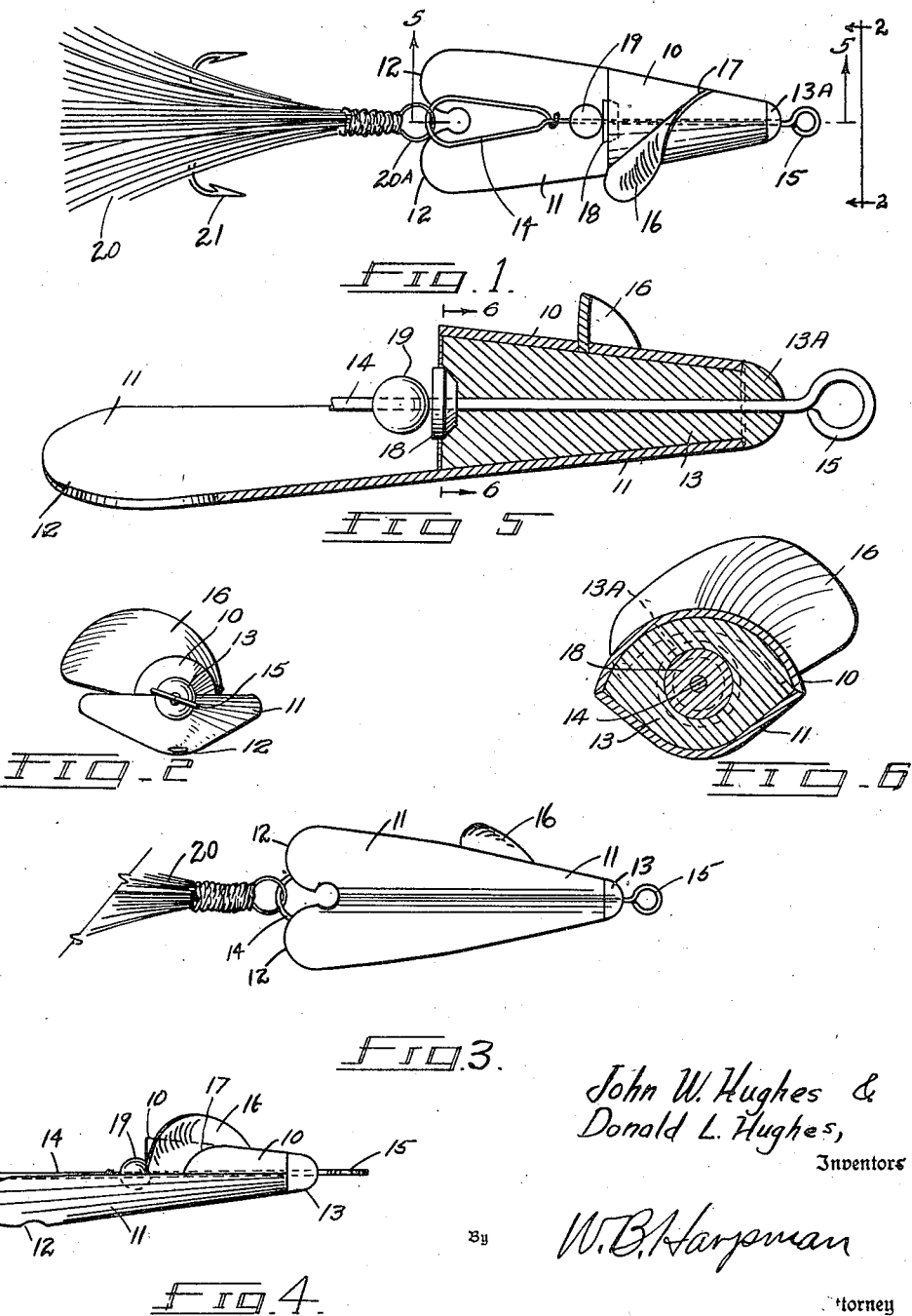

2,306,020

UNITED STATES PATENT OFFICE 2,306,020

FISH LURE

John Winslow Hughes and Donald L. Hughes, Youngstown, Ohio

Application June 12, 1941, Serial No. 397,662

3 Claims. (Cl. 43—45)

This invention relates to a fish lure and more particularly to a fish lure formed in two principal sections, one section of which is adapted to rotate at such times as the fish lure is drawn through the water as in casting.

The principal object of the invention is the provision of a fish lure provided with means for imparting rotation to a principal portion thereof.

A further object of the invention is the provision of a fish lure so formed that it possesses the proper amount of weight to enable it to be drawn through the water, as in casting, in a desirable manner.

A still further object of the invention is the provision of a fish lure formed with a bimetallic body portion, the metals used causing an attractive appearance and providing a practical bearing surface for the rotatable portion of the lure.

The fish lure shown and described herein has been designed to provide an attractive fish lure so formed that a major portion thereof will rotate rapidly upon being drawn through the water as in casting operations, thus forming an object of interest to fish and attracting their attention so as to cause them to assume that the lure is an attractive object and thereby makes its purpose useful. The fish lure, therefore, possesses desirable qualities and is of relatively simple construction and yet differs considerably from the fish lures known to the art wherein spinning action is obtained through conventional spoon construction.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

The invention is illustrated in the accompanying drawing, wherein:

Figure 1 is a top plan view of the fish lure and shows in detail the angular body, the rotating fin and the hooks attached thereto partially concealed in the fly or feathers of conventional design.

Figure 2 is a front end elevation taken on lines 2—2 of Figure 1 and shows in detail the curvature and placement of the rotating fin of the fish lure.

Figure 3 is a bottom elevation of the fish lure shown in Figures 1 and 2 and shows in detail the formation of the body portion thereof.

Figure 4 is a side elevation of the fish lure and shows the spiral placement of the rotating fin together with its cupped shape.

Figure 5 is a longitudinal vertical section on the axis of the device, and shows the formation thereof.

Figure 6 is a transverse section through the device and cutting the member 18 thereof and indicated generally by the line 6—6 on Figures 1 and 5.

By referring to Figures 1 and 2 of the drawing, it will be seen that the fish lure comprises a rotatable elongated body of angular cross-section, preferably a modified V-shape, the foremost portion of which is rounded upwardly and thus presents a round streamlined object to the flow of water backwardly over the lure. The lower portion 11 of the body extends rearwardly and terminates in a pair of rounded tail surfaces 12. The body portion itself is preferably formed of two portions of brass. The lowermost portion is considerably longer than the other and which is bent in modified V-shape as illustrated in Figures 2 and 4. The other body portion, as indicated by the numeral 10 in Figure 1, is rounded and formed in opposed relation to the semi V-shape of the heretofore mentioned body portion 11. By referring to Figures 5 and 6 of the drawing it will be seen that the space between the body portions 10 and 11 is preferably filled with tin, forming a tin core 13 the foremost end of which protrudes from the lure and forms a rounded nose 13A which in turn is drilled as is the tin core 13 so as to receive a shank 14 having an eyelet 15 formed on its foremost end and which is adapted to be attached to the fish line and is so positioned through the tin core 13 of the lure as to permit the lure to rotate thereabout, the rotating motion being imparted by means of a cupped fin 16 which is affixed to the lure by means of a diagonally positioned slot 17 formed in the rotatable body portion. The cupped fin, as may be seen by referring to the various figures in the drawing, is so shaped as to impart a spinning motion to the body portion of the lure at all times when the lure is drawn through the water. In order to avoid excess wear between the shank 14 and the tin core of the body portion a washer 18 is partially countersunk into the rear portion of the tin core of the body portion and a suitable bead 19 is positioned about the shank 14 immediately adjacent the washer 18. The rearmost portion of the shank 14 is formed into a flattened loop, as best illustrated in Figure 1, and to this loop a conventional fly 20 formed of feathers and hair or other desirable objects serves to hide and partially conceal a plurality of fish hooks 21. The hooks are attached to the shank 14 by means of a partial loop 20A. This portion of the lure is of conventional design and may be varied and does not constitute a part of this invention.

In order that fish may be attracted to the lure and particularly be drawn by its attraction to the proximity of the partially concealed hooks 21 the body portion of the lure is preferably formed of brass or other bright metal and by reason of its rotating action about the shank 14 caused by the cupped fin 16 it will be obvious that when drawn through the water the light reflecting from its surface creates the illusion of a small fish or similar objects swimming rapidly through the water which attracts the fish. It will thus be seen that the fish lure shown and described herein incorporates a spinning body portion formed in a manner to impart a continuous even rotating movement rather than uneven spinning movement commonly found in spinner baits.

It will also be seen that the lure is formed so that the shank portion is protected from wear and thus readily permits the body portion to rotate rapidly without tending to impart spinning motion to the remainder of the lure particularly that portion to which the fish line is attached and to which the fish hooks are attached. Thus the lure avoids the undesirable result of winding or twisting the fishing line end at the same time insures an attractive spinning motion of the main body portions thereof.

What we claim is:

1. A fish lure comprising an angular body member the forward portion of which is rounded and tapered axially and the rearward portion of which is of V-shaped cross section, a cupped fin affixed to said lure diagonally thereof, said fin adapted to impart rotating movement to the said lure upon being drawn through the water, the rearward portion of the said body member terminating in a pair of tail surfaces having a slot-like opening therebetween, and a shaft positioned axially of the said lure and through the said rounded portion thereof and provided with means on the forward end thereof for the attachment of a fish line thereto and means on the rearmost end thereof for the attachment of a hook and fly thereto.

2. A fish lure comprising an angular body portion the forward end of which is rounded and provided with a cupped fin located backwardly from the forward end thereof and adapted to impart rotating movement thereto upon being drawn through the water, the rearmost portion of the said angular body terminating in a pair of rounded tail surfaces having a semicircular slot-like opening therebetween, a shank axially positioned in a rotatable manner through the said rounded body portion, so that the lure may rotate thereabout, means on the forward end thereof for the attachment thereto of a fish line, and means on the rearmost end thereof for the attachment thereto of a fly and hooks.

3. A fish lure comprising a plate-like body of V-shaped cross-section and tapered axially, a secondary plate like body member of an inverted U-shaped cross-section affixed to the forward end of the said body member, a core of suitable material disposed between the said body members and formed into a rounded protruding forwardmost end, an opening formed in said core, a shaft positioned in the said opening and means formed on the said shaft for the attachment thereto of a fish line and a plurality of fish hooks, the rearwardly extending portion of the said body member terminating in a pair of rounded tail surfaces, and a fin positioned on the forward-most half of the said lure and diagonally thereof and adapted to impart rotating movement to the said body members so as to cause the same to rotate about the said shaft.

JOHN WINSLOW HUGHES.
DONALD L. HUGHES.